C. A. SIMMONS.
DRILL SOCKET.
APPLICATION FILED SEPT. 5, 1908.
924,388.
Patented June 8, 1909.
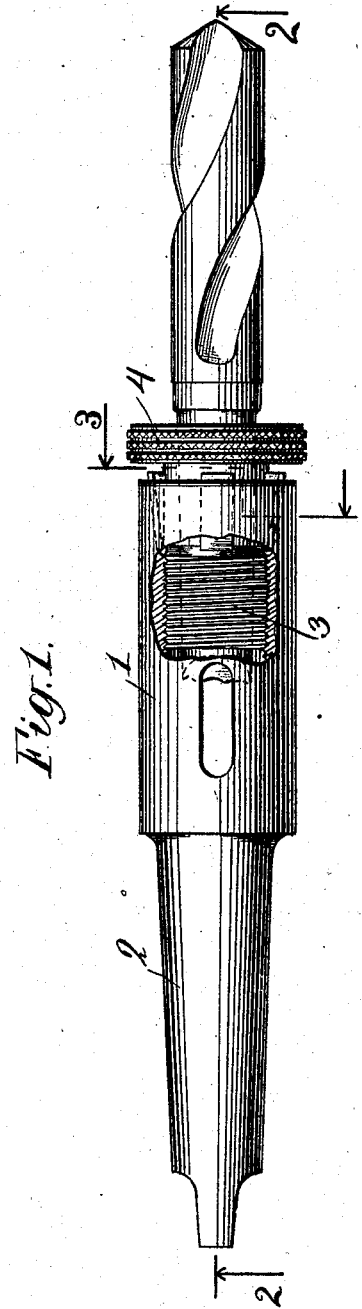
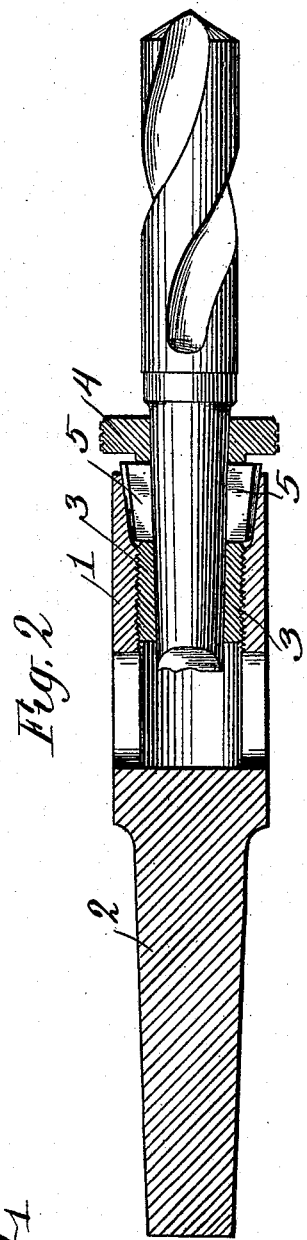
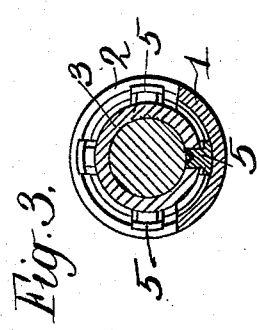
WITNESSES:
INVENTOR
Charles A. Simmons
BY
Penner Goldsborough
ATTORNEY

UNITED STATES PATENT OFFICE.

CHARLES A. SIMMONS, OF ALBANY, NEW YORK.

DRILL-SOCKET.

No. 924,388.

Specification of Letters Patent.

Patented June 8, 1909.

Application filed September 5, 1908. Serial No. 451,859.

*To all whom it may concern:*

Be it known that I, CHARLES A. SIMMONS, a citizen of the United States, residing at Albany, in the county of Albany and State of New York, have invented certain new and useful Improvements in Drill-Sockets; and I do hereby declare the following to be a full, clear, and exact description of the invention, such as will enable others skilled in the art to which it appertains to make and use the same.

The customary manner of preventing the turning of taper-shank drills in drill sockets is to provide a tang on the end of the shank which tang fits into a corresponding recess in the upper end of the socket.

The object of my invention is to provide a drill socket which will securely hold a taper-shank drill, or other tool, without a tang by automatically applying a friction grip to the shank of the tool capable of holding the tool against the turning strain of the drill in its work. With such a socket shanks from which the tang has been broken, or shanks manufactured without tangs, may be used without providing any interlocking projection and recess on the drill shank and socket, or without specially machining the ordinary taper shank in any way. To this end I employ a screw-threaded taper socket containing a correspondingly screw-threaded taper sleeve carrying gripping dogs or pawls and preferably adapted to be turned toward the gripping position by the turning strain of the tool in its work, so that the greater strains cause the dogs to grip the shank more securely.

In the drawings, which illustrate the best form now known to me in which my invention may be embodied; Figure 1 is an elevation, partly in section, of my improved socket with a drill in place; Fig. 2 is a section on the line 2—2 of Fig. 1, and Fig. 3 is a section on line 3—3 of Fig. 1.

The socket comprises a body portion 1, cylindrical in outline and terminating in the ordinary shank 2. The body portion contains a key-way as shown, through which a key may be driven to knock the tool out of the socket, and within the body portion is formed a cylindrical chamber terminating in a screw-threaded portion, and from the forward end of the screw-threaded portion to the end of the socket the wall is given a fairly sharp taper, as shown. The screw-threaded portion is adapted to take the screw threaded part of a cylindrical sleeve 3 tapered on its inside to correspond with the taper of the tool shank, and having a knurled head 4. In the wall of the cylindrical sleeve are formed a series of slots extending longitudinally thereof and adapted to receive gripping dogs 5, which are tapered on their outer sides to form a bearing surface to engage the tapered inner surface of body portion 1, and tapered on their inner sides to engage the drill shank. The screw threads on the interior of body portion 1 and on sleeve 3 should be so directed, as shown in Fig. 1, that the turning strain of the tool in its work tends to force the sleeve inward to increase the clamping pressure on dogs 5.

It is characteristic of my invention that the tool shank is gripped at any desired number of points around its periphery by the gripping dogs, and that the dogs are forced into engagement with the shank by the relative rotation of the body portion and the element which carries the dogs, these two elements being properly screw-threaded to effect that function. Thereby the turning strain of the tool in its work becomes effective to aid the gripping effect, and definite relatively sharp points of grip are established, as distinguished from frictional contact between the surface of the tool-shank and the smooth surface of the retaining socket.

What I claim is:—

1. A socket for rotary tools having a receiving chamber the wall of which is tapered at its forward end and is untapered and screw-threaded back of the tapered portion, a cylindrical screw-threaded sleeve engaging the screw-threaded wall of said chamber, and gripping dogs lying in slots in said sleeve and engaging the tapered wall of the chamber.

2. A socket for taper-shank tools comprising a body portion containing a chamber the wall of which is tapered at its forward end and is screw-threaded back of the tapered portion, a screw-threaded sleeve engaging the screw-threaded portion of the chamber wall and interiorly tapered to fit the tool shank, and gripping dogs lying in slots in said sleeve and having tapered backs engaging the tapered chamber wall and tapered faces engaging the tool-shank.

3. A socket for taper-shank tools comprising a body portion 1, containing a chamber the wall of which is tapered at its forward end, and is screw-threaded back of the tapered portion, a screw-threaded sleeve 3 having knurled head 4 engaging the screw-threaded portion of the chamber wall and interiorly tapered to fit the tool-shank, and gripping dogs 5 lying in slots in said sleeve and having tapered backs engaging the tapered chamber wall and tapered faces engaging the tool-shank.

In testimony whereof I affix my signature, in presence of two witnesses.

CHARLES A. SIMMONS.

Witnesses:
JOHN B. SOMERS,
STEPHEN T. BURNS.